(12) United States Patent
Hashimoto et al.

(10) Patent No.: US 7,400,120 B2
(45) Date of Patent: Jul. 15, 2008

(54) CONSTANT VOLTAGE CONTROL DEVICE

(75) Inventors: Koji Hashimoto, Tokyo (JP); Manabu Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 75 days.

(21) Appl. No.: 11/331,017

(22) Filed: Jan. 13, 2006

(65) Prior Publication Data
US 2007/0057657 A1 Mar. 15, 2007

(30) Foreign Application Priority Data
Sep. 12, 2005 (JP) ............................. 2005-263429

(51) Int. Cl.
*G05F 1/577* (2006.01)
(52) U.S. Cl. .................... 323/267; 323/268; 307/28
(58) Field of Classification Search ............ 323/267, 323/268, 269, 271; 307/28
See application file for complete search history.

(56) References Cited

U.S. PATENT DOCUMENTS

| | | | | |
|---|---|---|---|---|
| 5,608,314 A | * | 3/1997 | Woo ............................ | 323/313 |
| 5,637,991 A | * | 6/1997 | Brown et al. ................ | 323/282 |
| 5,977,755 A | * | 11/1999 | Miki et al. ................... | 323/269 |
| 6,229,292 B1 | * | 5/2001 | Redl et al. ................... | 323/285 |
| 6,281,665 B1 | * | 8/2001 | Miyaba et al. .............. | 323/224 |
| 6,643,151 B1 | * | 11/2003 | Nebrigic et al. ............. | 363/59 |
| 6,734,655 B1 | * | 5/2004 | Javanifard et al. .......... | 323/222 |
| 2003/0067287 A1 | * | 4/2003 | Morgen ....................... | 323/273 |
| 2004/0119339 A1 | * | 6/2004 | Sytwu ......................... | 307/28 |
| 2004/0174148 A1 | * | 9/2004 | Hiraki et al. ................ | 323/268 |
| 2005/0099168 A1 | * | 5/2005 | Takemura et al. ........... | 323/282 |

FOREIGN PATENT DOCUMENTS

| | | |
|---|---|---|
| DE | 101 49 282 A1 | 4/2003 |
| JP | 05-191970 | 7/1993 |
| JP | 07-095765 A | 4/1995 |
| JP | 10-098874 A | 4/1998 |
| JP | 2001-352675 A | 12/2001 |
| JP | 2003-316482 A | 11/2003 |
| JP | 2005-176409 A | 6/2005 |

* cited by examiner

*Primary Examiner*—Jeffrey L. Sterrett
*Assistant Examiner*—Stuart Hansen
(74) *Attorney, Agent, or Firm*—Sughrue Mion, PLLC

(57) ABSTRACT

A first output voltage Vcc is obtained via a first switching element from an external power supply, and a second output voltage Vme via a second switching element cascade-connected to the first switching element. The first switching element has a base current continuously controlled by a first comparator/amplifier to maintain the voltage Vcc at a predetermined value. The second switching element has a base current continuously controlled by a second comparator/amplifier to maintain the voltage Vme at a predetermined value. A third switching element connected in parallel to the first switching element and controlled by a duty-factor control circuit makes a bypass power supply to maintain a current flowing through the first switching element not more than a predetermined value. Thus, a constant voltage control device obtaining two types of stabilized voltages from external power supply of large voltage variation can reduce power consumption and improve voltage control accuracy.

14 Claims, 3 Drawing Sheets

CONSTANT VOLTAGE CONTROL DEVICE

BACKGROUND OF THE INVENTION

1. Field of the Invention

The present invention relates to a constant voltage control device that supplies difference types of stabilized voltages such as DC 5V and DC 3.3V or DC 2.5V from an on-vehicle battery to an on-vehicle electronic device including a microprocessor and various memories and, more particularly, to an improved constant voltage control device for decreasing power consumption of a constant voltage-controlling power transistor to suppress heat generation.

2. Description of the Related Arts

In order to achieve higher-speed operation and reduction in power consumption of a microprocessor to be mounted on an on-vehicle electronic control device and the like, it has been a technique widely adopted in practical use to decrease a voltage applied to an operation part or various memories, thereby applying thereto a stabilized voltage different from that of an input/output circuit section.

For example, the Japanese Patent Publication (unexamined) No. 352675/2001 "Power Supply for On-Vehicle Computing Unit" proposes a power supply circuit in which a first switching element for obtaining a stabilized voltage of DC 5V from an on-vehicle battery and a second switching element for obtaining DC 3.3V are connected in series.

Further, the Japanese Patent Publication (unexamined) No. 316482/2003 "Power Supply Circuit" discloses means in which a switching-type primary power supply regulator is disposed for obtaining a primary power supply voltage from an on-vehicle battery, and a plurality of dropper-type secondary power supply regulators are connected to a primary voltage output of which voltage is dropped and stabilized, thereby obtaining various stabilized voltages of DC 5V or DC 3.3V.

Furthermore, the Japanese Patent No. 3143284 "DC Stabilized Power Supply Unit" discloses means in which a switching-type primary chopper regulator and a dropper-type secondary series regulator are connected in series to obtain a stabilized voltage of lower ripple fluctuation and lower power consumption.

Additionally, the Japanese Patent Publication (unexamined) No. 98874/1998 "DC Stabilized Power Supply" discloses means in which a switching-type primary chopper regulator and a dropper-type secondary series regulator are connected in parallel to obtain a stabilized voltage of lower ripple fluctuation and lower power consumption.

According to the above-mentioned Japanese Patent Publication (unexamined) No. 352675/2001 "On-Vehicle Computing Unit Power Supply", both first and second switching elements are dropper-type voltage regulators, so that a problem exists in too much power consumption of the first switching element at the time of a high power supply voltage of an on-vehicle battery and a large load current.

In contrast, according to the Japanese Patent Publication (unexamined) No. 316482/2003 "Power Supply Circuit", it is certain that a power consumption of dropper-type secondary power supply regulators for obtaining DC 5V is enormously reduced due to the series connection of a switching-type primary power supply regulator. But, for example, when an output voltage from the primary power supply regulator is DC 7V, a voltage drop amount of the dropper-type secondary power supply regulator for obtaining DC 3.3V is 7V−3.3V=3.7V, so that a problem exists in that a power consumption is not sufficiently reduced.

In particular, a voltage drop amount of the secondary power supply regulator for obtaining DC 2.5V is 7V−2.5=4.5V, resulting in too much power consumption. Thus, when disposing a plurality of switching-type primary power supply regulators, a problem exists in larger-sized and more expensive device.

On the other hand, "DC Stabilized Power supply Unit" of the Japanese Patent No. 3143284 and "DC Stabilized Power Supply" of the Japanese Patent Publication (unexamined) No. 98874/1998 are for obtaining a single stabilized voltage, and do not propose means for obtaining plural types of stabilized voltages.

In the case of "DC Stabilized Power Supply" of the Japanese Patent Publication (unexamined) No. 98874/1998, being the invention relevant to the present invention, a problem exists in that output voltages from a pair of regulators connected in parallel are difficult to be in coincidence accurately, and that over-voltage ripple of a switching-type primary chopper regulator cannot be eliminated.

SUMMARY OF THE INVENTION

The present invention was made to solve the problems described above, and has an object of providing a constant voltage control device capable of obtaining a stable output voltage upon rapid change of a power supply voltage or a load current, and reducing a power consumption by using in combination one switching-type regulator and two dropper-type regulators.

It is a further object of the invention to provide a constant voltage control device capable of reducing ripple fluctuation in output voltage from a switching-type regulator, and obtaining a stabilized output voltage.

A constant voltage control device according to the invention is supplied with an electric power from an external power supply of which output voltage is inconstant, and applies plural different types of stabilized voltages to an electronic control device; and the constant voltage control device includes a first switching element generating a first output voltage, a second switching element that is cascade-connected to this first switching element and generates a second output voltage, and a third switching element acting as a by-pass power supply circuit with respect to the mentioned first switching element.

The mentioned first switching element is a transistor of which conduction state is negative-feedback controlled by a first comparator/amplifier comparing a voltage proportional to the mentioned first output voltage with a reference voltage so that the mentioned first output voltage may be a first predetermined voltage.

The mentioned second switching element is a transistor of which conduction state is negative-feedback controlled by a second comparator/amplifier comparing a voltage proportional to the mentioned second output voltage with a reference voltage so that the mentioned second output voltage may be a second predetermined voltage, being a value smaller than the mentioned first predetermined voltage.

The mentioned third switching element is a transistor in which a ratio between closed circuit period and switching cycle is controlled via a duty-factor control circuit, and which makes the control of suppressing a flowing current through the mentioned first switching element.

According to the constant voltage control device of the invention, the first switching element and the second switching element that form dropper-type voltage regulators operating at high speed and with high accuracy are connected in series; and the third switching element that forms a switching-type voltage regulator of low power consumption is connected in parallel to the first switching element. Furthermore, the third switching element forms a by-pass power supply circuit so as to prevent a current flowing through the first switching element from being not less than a predetermined value.

As a result, to cope with the rapid change in power supply voltage or load current, the conduction states are immediately controlled with the first switching element and the second switching element, thus enabling to obtain an output voltage at high speed and with high accuracy. In addition, a load current applied to the first switching element 130b having a large voltage drop amount at the time of high voltage is suppressed, thus enabling to achieve the reduction of power consumption for obtaining the first output voltage.

Furthermore, a voltage applied to the second switching element is further stabilized and suppressed by means of the first switching element, so that it is possible to achieve the reduction of power consumption for obtaining the second output voltage.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
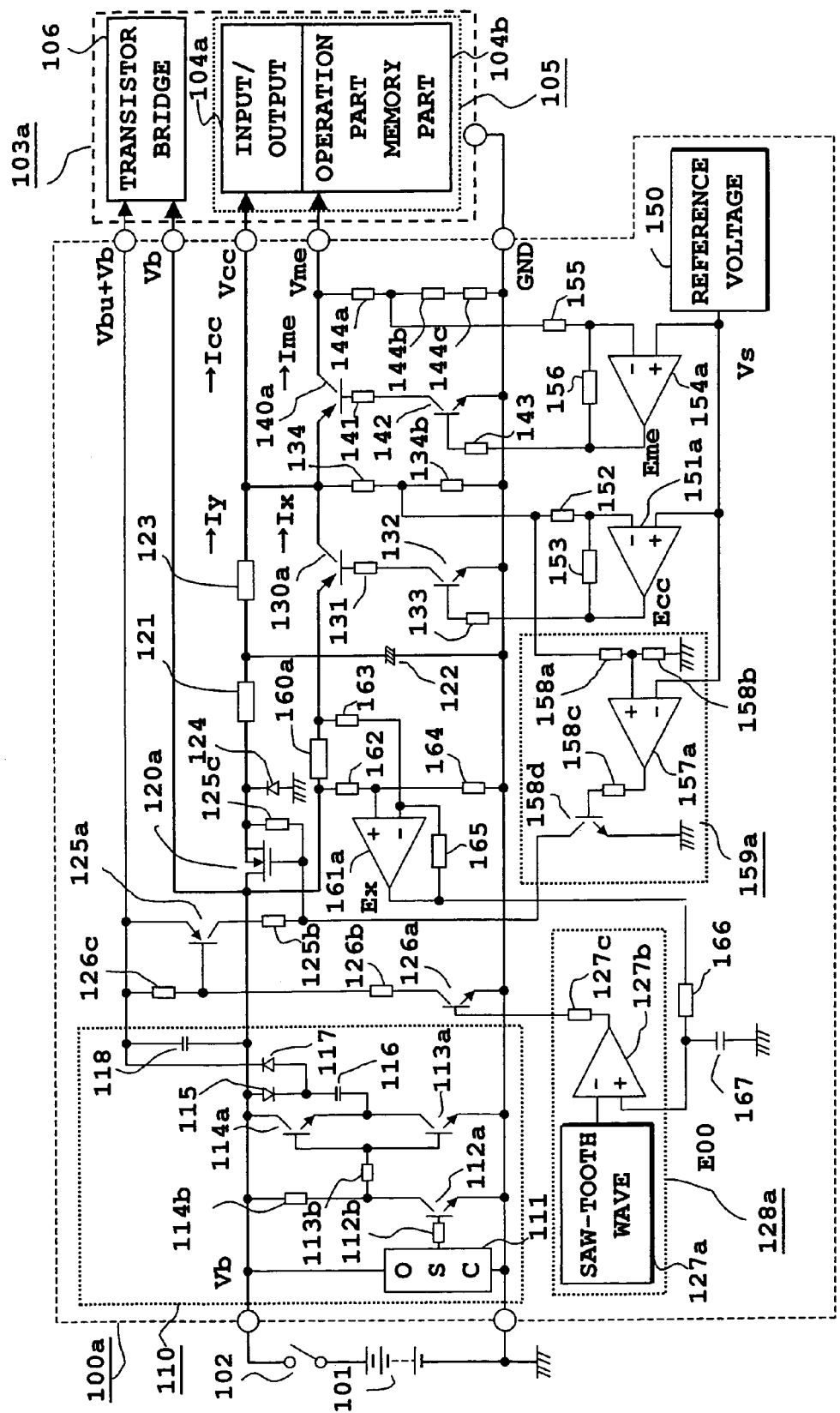
FIG. 1 is a circuit diagram showing an overall circuit arrangement of a constant voltage control device according to a first preferred embodiment of the invention.

Several preferred embodiments according to the present invention are hereinafter described referring to the drawings.

In addition, the same reference numerals refer to the same or like parts in the drawings.

Embodiment 1

FIG. 1 is a circuit diagram showing an overall circuit arrangement of a constant voltage control device according to a first embodiment of the present invention.

With reference to FIG. 1, an on-vehicle battery 101, being an external power supply generates a DC voltage of, for example, DC 12V, and is connected to a constant voltage control device 100a via a power supply switch such as key switch.

An electronic control device 103a is principally formed of a microprocessor 105 consisting of an input/output part 104a and an operation part • memory part 104b that includes various memories. This electronic control device 103a contains therein a transistor bridge circuit 106 for controlling, for example, a DC electric motor, not shown.

A first output voltage Vcc=5V or a second output voltage Vme=3.3V (or 2.5V) as described later is supplied to the electronic control device 103a from the constant voltage control device 100a. It is arranged such that the input/output part 104a of the microprocessor 105 operates with the first output voltage Vcc, and the operation part • memory part 104b operates with the second output voltage Vme.

Further, an auxiliary output voltage Vbu as described below is supplied from the constant voltage control device 100a to the electronic control device 103a, and is used as a gate power supply of an N channel field effect transistor in the transistor bridge circuit 106.

In a charge pump circuit 110 for generating an auxiliary output voltage Vbu, an oscillator 111 has alternating logic levels of "H" and "L" of outputs at a frequency of, for example, several dozen MHz to switch a transistor 112a via a base resistor 112b.

When the transistor 112a is in a closed circuit, a charging transistor 113a is brought in a closed circuit via a base resistor 113b, while a discharging transistor 114a, which is connected in series to the charging transistor 113a, will be brought in an open circuit.

When the transistor 112a is in an open circuit, the discharging transistor 114a is brought in a closed circuit via a series circuit of a base resistor 114b and a base resistor 113b, while the charging transistor 113a will be brought in an open circuit.

At the time of the charging transistor 113a being in a closed circuit, a charge and discharge capacitor 116 is charged from the external power supply 101 via a charging diode 115. However, when the discharge transistor 114a is in a closed circuit instead of the charging transistor 113a, a part of the electric charge having been charged of the charge and discharge capacitor 116 is discharged to a charge storage capacitor 118 via a discharging diode 117.

As a result, when a discharge load current of the charge storage capacitor 118 is small, a voltage across the charge storage capacitor 118 will rise until it is nearly equal to a power supply voltage Vb of the external power supply 101. In practical, this voltage across the charge storage capacitor 118 is balanced at a voltage corresponding to a value of the discharge load current of the charge storage capacitor 118.

A power supply voltage Vb of the external power supply 101 is applied to a drain terminal of a third switching element, being an N channel field effect transistor, and a source terminal thereof is connected to a smoothing capacitor 122 and a balancing resistor 123 via a choke coil 121.

Additionally, the smoothing capacitor 122 is charged via the choke coil 121 when the third switching element 120a is in a closed circuit. When, however, the third switching element 12a is in an open circuit, an attenuating current due to an inductance component of the choke coil 121 returns by means of a current return circuit formed of a current return diode 124, the choke coil 121, and the smoothing capacitor 122.

A transistor 125a to be supplied with an electric power from a charge storage capacitor 118 is arranged to supply a circuit-closing command voltage to a gate terminal of the third switching element 120a via a gate resistor 125b. A circuit-opening ballast resistor 125c is connected between a gate terminal and a source terminal of the third switching element 120a.

A transistor 126a to be driven from a duty-factor control circuit 128a as described later is connected to a base terminal of the transistor 125a via a base resistor 126b. A circuit-opening ballast resistor 126c is connected between an emitter terminal and a base terminal of the transistor 125a.

The duty-factor control circuit 128a is formed of a sawtooth wave oscillator circuit 127a and a comparator 127b, and is connected in the relationship of closing a circuit of a transistor 162a via a base resistor 127c from an output terminal of the comparator 127b when an output voltage from the sawtooth wave oscillator circuit 127a to be applied to an inverting input of the comparator 127b is not more than an average current detection signal voltage E00 as described later to be applied to non-inverting input of the comparator 127b.

The first switching element 130a, being a PNP-type junction transistor, is supplied with an electric power from the external power supply 101 via a current detection resistor 160a as described later to generate a first output voltage Vcc.

In addition, a by-pass power supply circuit that is formed of a series circuit of the third switching element 102a, the choke coil 121 and the balancing resistor 123, is connected in parallel to a series circuit of the current detection resistor 160a and the first switching element 130a.

A series circuit of a base resistor 131 and a driving transistor 132 is connected to a base terminal of the first switching element 130a. When the driving transistor 132 is brought in conduction via a base resistor 133, which is connected to a base terminal of the driving transistor 132, a base current corresponding to a conduction level of the driving transistor 132 flows through the first switching element 130a, and a collector current almost proportional to this base current will flow.

Voltage-dividing resistors 134a and 134b are connected in series to each other, to which the first output voltage Vcc is applied. Further, a voltage across the voltage-dividing resistor 134b is a detection signal voltage proportional to the first output voltage Vcc.

The second switching element 140a, being a PNP-type junction transistor, is cascade-connected to the first switching element 130a to generate the second output voltage Vme lower than the first output voltage Vcc.

A series circuit of a base resistor 141 and a driving transistor 142 is connected to a base terminal of the second switching element 140a. When the driving transistor 142 is brought in conduction via a base resistor 143, which is connected to the base terminal of the driving transistor 142, a base current corresponding to a conduction level of the driving transistor 142 flows through the second switching element 140a, and a collector current almost proportional to this base current will flow.

Voltage-dividing resistors 144a, 144b and 144c are connected in series to each other, to which the second output voltage Vme is applied. Further, a voltage across the voltage-dividing resistor 144b and 144c is a detection signal voltage proportional to the second output voltage Vme.

A reference voltage generation circuit 150 is a circuit that generates a constant voltage, for example, 1.7V as a reference voltage Vs. A reference voltage Vs is applied to a non-inverting input of a first comparator/amplifier 151a or a second comparator/amplifier 154a and an inverting input of a comparator/amplifier 157a as described later.

An inverting input terminal of the first comparator/amplifier 151a is connected to a connection point of the voltage-dividing resistors 134a and 134b via an input resistor 152, and is also connected to an output terminal of the first comparator/amplifier 151a via a feedback resistor 153. An output terminal of the first comparator/amplifier 151a controls conduction states of the driving transistor 132 via the base resistor 133.

An inverting input terminal of the second comparator/amplifier 154a is connected to a connection point of the voltage-dividing resistors 144a and 144b via an input resistor 155, and is also connected to an output terminal of the second comparator/amplifier 154a via a feedback resistor 156. An output terminal of the second comparator/amplifier 154a controls conduction states of the driving transistor 142 via a base resistor 143.

A non-inverting terminal of the comparator/amplifier 157a is connected to a connection point between the voltage-dividing resistors 158a and 158b. These voltage-dividing resistors 158a and 158b are connected in series to each other and connected to a connection point between the voltage-dividing resistors 134a and 134b.

An output terminal of the comparator/amplifier 157a drives a transistor 158d via a base resistor 158c. This transistor 158d is connected to a gate terminal of the third switching element 120a, and is connected in such a relationship that the third switching element 120a is brought in an open circuit when the transistor 158d is in a closed circuit.

An over-voltage suppression circuit 159a is formed of the comparator/amplifier 157a, the voltage-dividing resistors 158a and 158b, the base resistor 158c and the transistor 158d; and this over-voltage suppression circuit 159a operates when the first output voltage Vcc becomes larger exceeding an allowable limit of error, and forces the third switching element 120a to be in an open circuit.

A third comparator/amplifier 161a acts as a differential amplifier of voltage across the above-described current detection resistor 160a. A non-inverting input terminal thereof is connected to the high potential side of the current detection resistor 160a via an input resistor 162; and an inverting input terminal thereof is connected to the low potential side of the current detection resistor 160a via an input resistor 163, and is connected to an output terminal of the third comparator/amplifier 161a via a feedback resistor 165. Further, a voltage-dividing resistor 164 is connected in series to an input resistor 162.

The third comparator/amplifier 161a has an output terminal to which a capacitor 167 is connected via an output resistor 166. A charging voltage of the capacitor 167 is applied to a non-inverting input terminal of the above-described comparator 127b.

Figure 2:
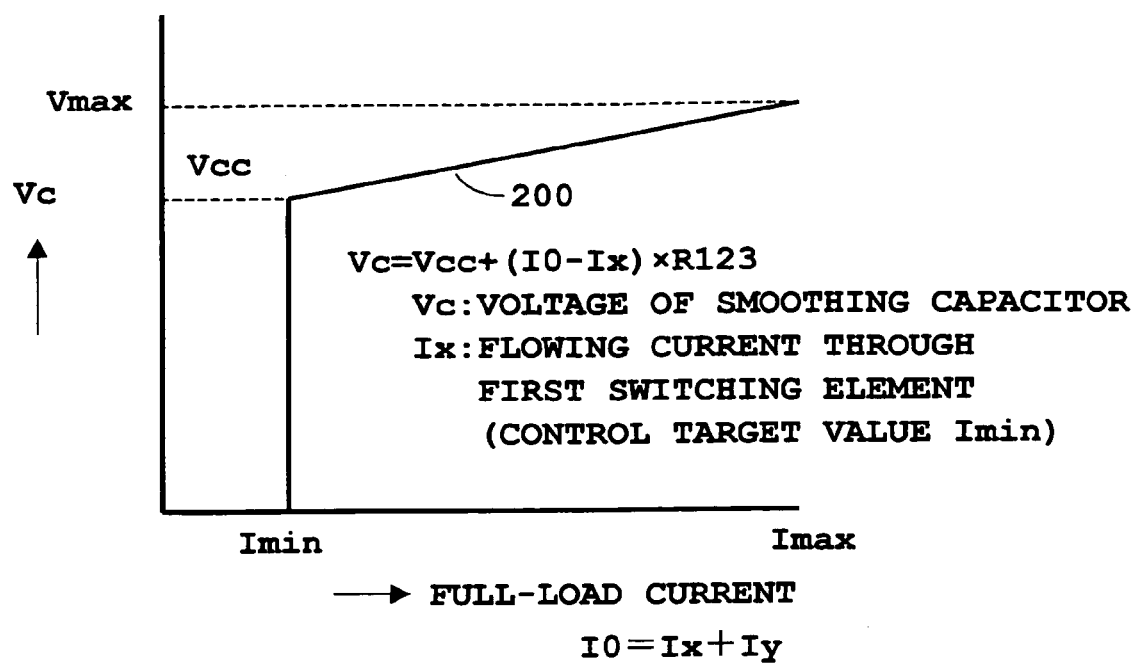
FIG. 2 is a graphic diagram showing charge characteristics of a smoothing capacitor (that is, the change of a voltage Vc of a smoothing capacitor with respect to a full-load current of a microprocessor).

FIG. 2 is a graphic diagram showing charge characteristics of a smoothing capacitor 122 (that is, a voltage Va of the smoothing capacitor 122 with respect to a full-load current of a microprocessor 105).

Figure 3:
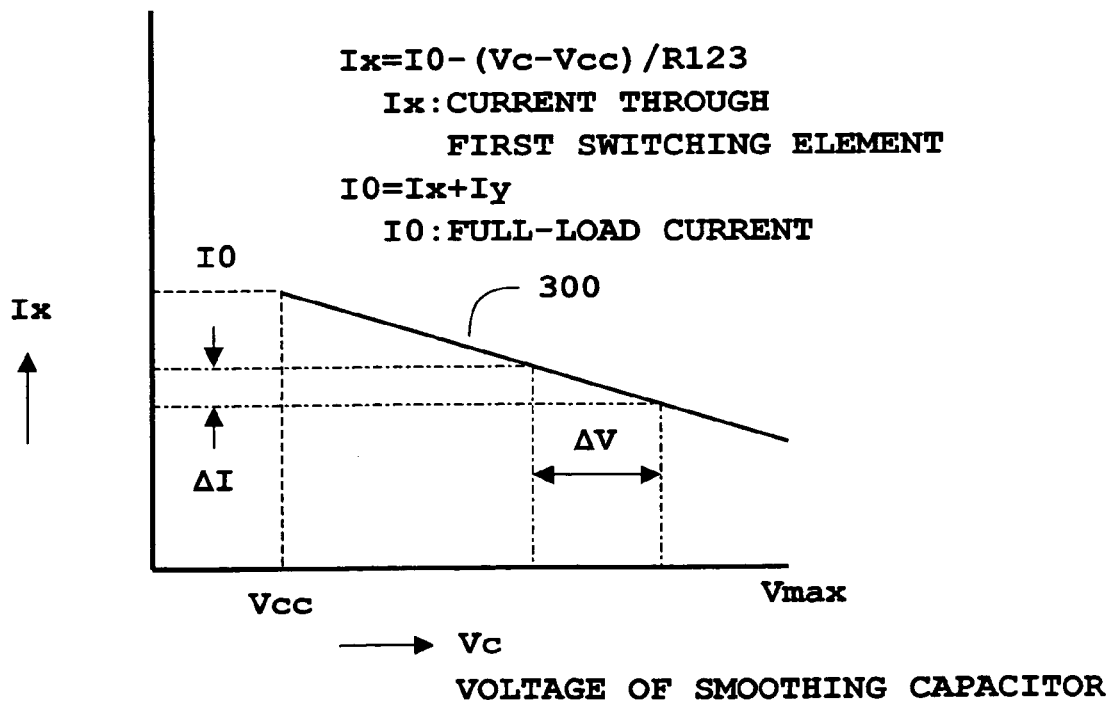
FIG. 3 is a graphic diagram showing transient fluctuation characteristics of a first switching element (that is, the change of a current of the first switching element with respect to a voltage Vc of a smoothing capacitor).

Further, FIG. 3 is a graphic diagram showing transient fluctuation characteristics of the first switching element (that is, a current of the first switching element 130a with respect to a voltage Vc of the smoothing capacitor 122).

With reference to FIGS. 2 and 3, action and operation of the constant voltage control device according to the first embodiment are described in detail.

In FIG. 1, when the power supply switch 102 is brought in a closed circuit, the oscillator 111 starts the oscillation operation, and the transistor 112a makes the high-speed switching operation. When the transistor 112 is in a closed circuit, the charge and discharge capacitor 116 is charged via the external power supply 101, the power supply switch 102, the charging diode 115, the charge and discharge capacitor 116, and the charging transistor 113a.

When the transistor 112a is in an open circuit, the charge storage capacitor 118 is charged via the charge and discharge capacitor 116, the discharge diode 117, the charge storage capacitor 118, and the discharge transistor 114a.

As a result, a voltage across the charge storage capacitor 118 is kept to be not less than 6V.

The first switching element 130a to be supplied with an electric power via the power supply switch 102 and the current detection resistor 160a from the external power supply 101 has its base current controlled by the first comparator/amplifier 151a. This first switching element 130a is continuously controlled to be in such a conduction state that the first output voltage Vcc is maintained at, for example, DC 5V, being a first predetermined voltage.

In addition, an output voltage Ecc from the first comparator/amplifier 151a is calculated with the following equation when letting a reference voltage, being a voltage generated by a reference voltage generation circuit Vs, and a division ratio of the voltage-dividing resistors 134a and 134b α:

$$Ecc = Vs + (Vs - \alpha Vcc) \times (R153/R152) \quad (1)$$

where: α=R134b/(R134a+R134b)

In addition, R134a, R134b, R152, R153 are resistance values of the voltage-dividing resistors 134a and 134b, the input resistor 152, and the feedback resistor 153.

The first switching element 130a and the driving transistor 132 are controlled to be in conduction state based on output voltages Ecc, and are negative feedback controlled so as to be Vs≈αVcc.

Accordingly, the first output voltage Vcc is a constant voltage to be calculated with the following equation:

$$Vcc = Vs/\alpha = Vs \times (R134a + R134b)/R134b \quad (2)$$

On the other hand, the second switching element 140a that is cascade-connected to the first switching element 130a has its base current controlled by the second comparator/amplifier 154a. This second switching element 140a is continuously controlled to be in such a conduction state that the second output voltage Vme is maintained at, for example, DC 3.3V (or DC 2.5V) being a second predetermined voltage.

Further, an output voltage Eme from the second comparator/amplifier 154a is calculated with the following equation when letting a reference voltage, being a voltage generated by the reference voltage generation circuit Vs, and a voltage division ratio β:

$$Eme = Vs + (Vs - \beta Vme) \times (R156/R155) \quad (3)$$

where: β=(R144b+R144c)/(R144a+R144b+R144c)

In addition, R144a, R144b, R144c, R155, R156 are resistance values of the voltage-dividing resistors 144a, 144b and 144c, the input resistor 155, and the feedback resistor 156.

The second switching element 140a and the driving transistor 142 are controlled to be in conduction states based on output voltages Eme, and are negative feedback controlled so as to be Vs≈βVme.

Accordingly, the second output voltage Vme is a constant voltage to be calculated with the following equation:

$$Vme = Vs/\beta = Vs \times (R144a + R144b + R144c)/(R144b + R144c) \quad (4)$$

Furthermore, such resistances as to be R134a≈R144a and R134b≈R144b are selected, and a voltage-dividing resistance R144c is added on the inverting input side of the second comparator/amplifier 154a. Thus, the relationship of division ratio â>a, is maintained, and the relationship of Vcc>Vme will hold with respect to the same reference voltage Vs.

An output voltage Ex from the third comparator/amplifier 161a is calculated with the following equation when letting resistance values of the current detection resistor 160a, the input resistors 162 and 163, the voltage-dividing resistor 164, and the feedback resistor 165 R160a, R162, R163, R164 and R165, and letting a flowing current through the current detection resistor 160a Ix, and a power supply voltage Vb:

$$Ex = A \times Vb + B \times Ix \quad (5)$$

where:
A=(R163×R164−R162×R165)/[R163×(R162+R164)]≈0
B=R160a×(R165/R163)

In addition, such resistors as to be R162≈R163 and R164≈R165 are selected. It is such a circuit arrangement as to be A=0, supposing that there is no variation in parts, and those of just a designed value are used.

Thus, an output voltage Ex of the third comparator/amplifier 161a is a value proportional to a flowing current Ix through the first switching element 130a. A charging voltage of the capacitor 167 is an average current detection signal voltage E00 to be a value proportional to a value obtained by smoothing ripple fluctuations of a flowing current Ix.

In the duty-factor control circuit 128a, an output logic level of the comparator 127b is "H" during the period until a triangular wave output voltage of the saw-tooth wave oscillator circuit 127a reaches an average current detection signal voltage E00, thereby the transistor 126a being in a closed circuit. As a result, the transistor 125a and the third switching element 120a are in a closed circuit.

An output logic level of the comparator 127b is "L" during the period until a triangular wave output voltage of the saw-tooth wave oscillator circuit 127a is not less than an average current detection signal voltage E00, thereby the transistor 126a being in an open circuit. As a result, the transistor 125a and the third switching element 120a are in an open circuit.

Accordingly, with respect to an oscillation period ô of the saw-tooth wave oscillator circuit 127a, a closed circuit period ôon in which the third switching element 120a is in a closed circuit comes to be a larger value as an average current detection signal voltage E00 becomes larger, and acts on the operation of suppressing a flowing current Ix through the current detection resistor 160a.

Further, when the third switching element 120a is brought in a closed circuit, the smoothing capacitor 122 will be gradually charged via the choke coil 121, and a charging voltage Vc will rise by degrees.

Furthermore, when the third switching element 120a is brought in an open circuit, a charging current of the smoothing capacitor 122 gradually decreases via the current return diode 124 and the choke coil 121, and the charging voltage Vc will drop by degrees.

When letting a resistance value of the balancing resistor 123 R123, and letting a flowing current through the first switching element 130a via the current detection resistor 160a Ix, a flowing current through the balancing resistor 123 Iy, and a full-load current with respect to the microprocessor 105 I0, the following equation will be established:

$$Vc = Iy \times R123 + Vcc \quad (6)$$

$$I0 = Ix + Iy \quad (7)$$

With reference to FIG. 2 showing characteristics of an ideal charging voltage Vc, a straight line 200 indicating the charging voltage Vc rises as a full-load current I0, which is shown with the horizontal axis, increases.

The reason of showing such characteristics is as follows. As a result of a duty-factor of the third switching element 120a being controlled so that a flowing current Ix through the first switching element 130a may be the minimum value Imin with the duty-factor control circuit 128a, the charging voltage Vc increases as a full-load current I0 increases, resulting in the increase of a flowing current Iy through the third switching element 120a side.

With reference to FIG. 3 showing transient fluctuation characteristics, the charging voltage Vc, which is indicated by the horizontal axis, includes a ripple voltage ΔV that increases or deceases responsive to the switching operation of the third switching element 120a.

Accordingly, a flowing current Iy through the balancing resistor 123 also increases or decreases. To secure a predetermined full-load current I0, a flowing current Ix through the first switching element 130a side has a ripple current ΔI as indicated by the straight line 300 to be balanced on the whole.

When a power supply voltage Vb is rapidly decreased and the charging voltage Vc is transiently insufficient, the first switching element 130a is brought in a highly conduction state, thus enabling to immediately obtain the stable first output voltage Vcc.

However, when the power supply voltage Vb is rapidly increased and the charging voltage Vc is transiently going to rise to be too large, the over-voltage suppression circuit 159a operates to immediately cause the third switching element 120a to be in an open circuit.

In addition, a load current flowing through the input/output part 104a of the microprocessor 105 is, for example, 0.1 A, while a load current Ime flowing through the operation part and memory part 104a is, for example, 0.5 A. On the supposition that a control target current Imin flowing through the first switching element 130a is to be, for example, 0.2 A and the remaining 0.4 A is to be supplied from the third switching element 120a, a power consumption of the fist switching element 120a will be decreased to be 0.2/0.6=⅓.

As is understood from the heretofore description, the constant voltage control device according to the first embodiment of the invention is a constant voltage control device 100a that is supplied with an electric power from an external power supply 101 which output voltage Vb is inconstant, and applies plural different types of stabilized voltages to an electronic control device 103a; and the mentioned constant voltage control device 100a comprises a first switching element 130a generating a first output voltage Vcc, a second switching element 140a that is cascade-connected to this first switching element 130a and generates a second output voltage Vme, and a third switching element 120a acting as a by-pass power supply circuit with respect to the mentioned first switching element 130a.

The mentioned first switching element 130a is a transistor of which conduction state is negative-feedback controlled by a first comparator/amplifier 151a comparing a voltage proportional to the mentioned first output voltage Vcc with a reference voltage Vs so that the mentioned first output voltage Vcc may be a first predetermined voltage.

The mentioned second switching element 140a is a transistor of which conduction state is negative-feedback controlled by a second comparator/amplifier 154a comparing a voltage proportional to mentioned second output voltage Vme with a reference voltage Vs so that the mentioned second output voltage Vme may be a second predetermined voltage, being a value smaller than the mentioned first predetermined voltage.

The mentioned third switching element 120a is a transistor in which a ratio between a closed-circuit period ôon and a switching cycle ô is controlled via a duty-factor control circuit 128a, and which makes the control of suppressing a flowing current through the mentioned first switching element 130a.

Accordingly, with respect to the rapid change of a power supply voltage or a load current, the control of conduction state is immediately made by the first switching element and the second switching element, thus enabling to obtain an output voltage at high speed and with high accuracy. Further, a load current on the first switching element having a large voltage drop amount at the time of high voltage is suppressed, thus enabling to achieve the reduction of power consumption for obtaining the first output voltage.

Furthermore, the voltage to be applied to the second switching element is further stabilized and suppressed by means of the first switching element, so that it is possible to achieve the reduction of power consumption for obtaining the second output voltage.

According to the first embodiment, the mentioned by-pass power supply circuit further comprises a choke coil 121 and a balancing resistor 123 connected in series to an output circuit of the mentioned third switching element.

Further, output voltage from the mentioned choke coil 121 is smoothed by a smoothing capacitor 122, and there is provided a current return diode 124 forming a current return circuit that includes the mentioned choke coil 121 and smoothing capacitor 122 when the mentioned third switching element 120a is brought in an open circuit. The mentioned balancing resistor 123 is connected between the mentioned smoothing capacitor 122 and an output terminal of the mentioned first switching element 130a.

As a result, it is possible to suppress variations in the charging voltage Vc of the smoothing capacitor 122, and it is possible to suppress a coefficient of variation of a flowing current through the first switching element 130a due to ripple fluctuation included in a deviation voltage between the charging voltage Vc of the smoothing capacitor 122 and the first output voltage Vcc.

In addition, according to the first embodiment, the mentioned constant voltage control device 100a further comprises a current detection resistor 160a connected in series to the mentioned first switching element 130a, and a third comparator/amplifier 161a that amplifies a voltage across this current detection resistor 160a to obtain a current detection signal voltage Ex proportional to a flowing current Ix through the mentioned first switching element 130a; and the mentioned duty-factor control circuit 128a causes a duty factor of the mentioned third switching element 120a to be higher when the mentioned current detection signal voltage Ex is increased.

As a result, the flowing current Ix through the first switching element 120a is accurately suppressed and controlled, thus enabling to reduce temperature rise in the first switching element 120a.

Further, according to the first embodiment, the mentioned constant voltage control device 100a further comprises an over-voltage suppression circuit 159a, and this over-voltage suppression circuit 159a is connected in such a relationship as to act when the mentioned first output voltage Vcc is too large, and to cause the mentioned third switching element 120a to be immediately in an open circuit in spite of being in a closed-circuit period determined by the mentioned duty-factor control circuit 128a.

As a result, the transiently rapid increase of the first output voltage Vcc with respect to the rapid increase of a power supply voltage is suppressed, thus enabling to obtain a stable output voltage.

In addition, according to the first embodiment, the mentioned third switching element 120a is an N-channel field effect transistor, and the mentioned constant voltage control device 100a further comprises a charge pump circuit 110. The mentioned charge pump circuit 110 obtains an auxiliary output voltage Vbu+Vb, which is higher than an external power supply voltage Vb, by the addition to the mentioned external power supply 101, and functions to apply a circuit-closing command voltage higher than that of a source terminal to a gate terminal of the mentioned N-channel field effect transistor.

As a result, the third switching element 120a that is ON/OFF controlled employs an inexpensive N-channel field effect transistor, and an output voltage that is provided from the charge pump circuit for obtaining a gate voltage may be utilized for the other objects.

Further, according to the first embodiment, each of the mentioned first and second switching elements 130a and 140a is a PNP-type junction transistor; and the mentioned first and second comparators/amplifiers 151a and 154a make the negative feedback control of a conduction state of the mentioned first and second switching elements 130a and 140a in the relationship of supplying a base current substantially proportional to a collector current of this junction transistor.

As a result, it is possible to easily make the continuous negative feedback control of the output voltage from the first and second switching elements 130a and 140a using a junction-type transistor having good characteristics of the ratio between base current and collector current. In addition, it is possible to be effectively applied to such cases as when a power supply voltage Vb is decreased, resulting in a very small voltage difference between the power supply voltage Vb and the first output voltage Vcc, or when a difference between the first output voltage Vcc and the second output voltage Vme is very small.

Furthermore, according to the first embodiment, the mentioned electronic control device 103a contains a microprocessor 105; and the mentioned first predetermined voltage is a voltage of DC 5V for supplying an electric power to an input/output part 104a of the mentioned microprocessor 105, and the mentioned second predetermined voltage is a voltage of either DC 3.3V or DC 2.5V for supplying an electric power to an operation part and memory part 104b of the mentioned microprocessor 105.

As a result, the first and second switching elements 130a and 140a are connected in series, thus enabling to obtain the second predetermined voltage.

Embodiment 2

Figure 4:
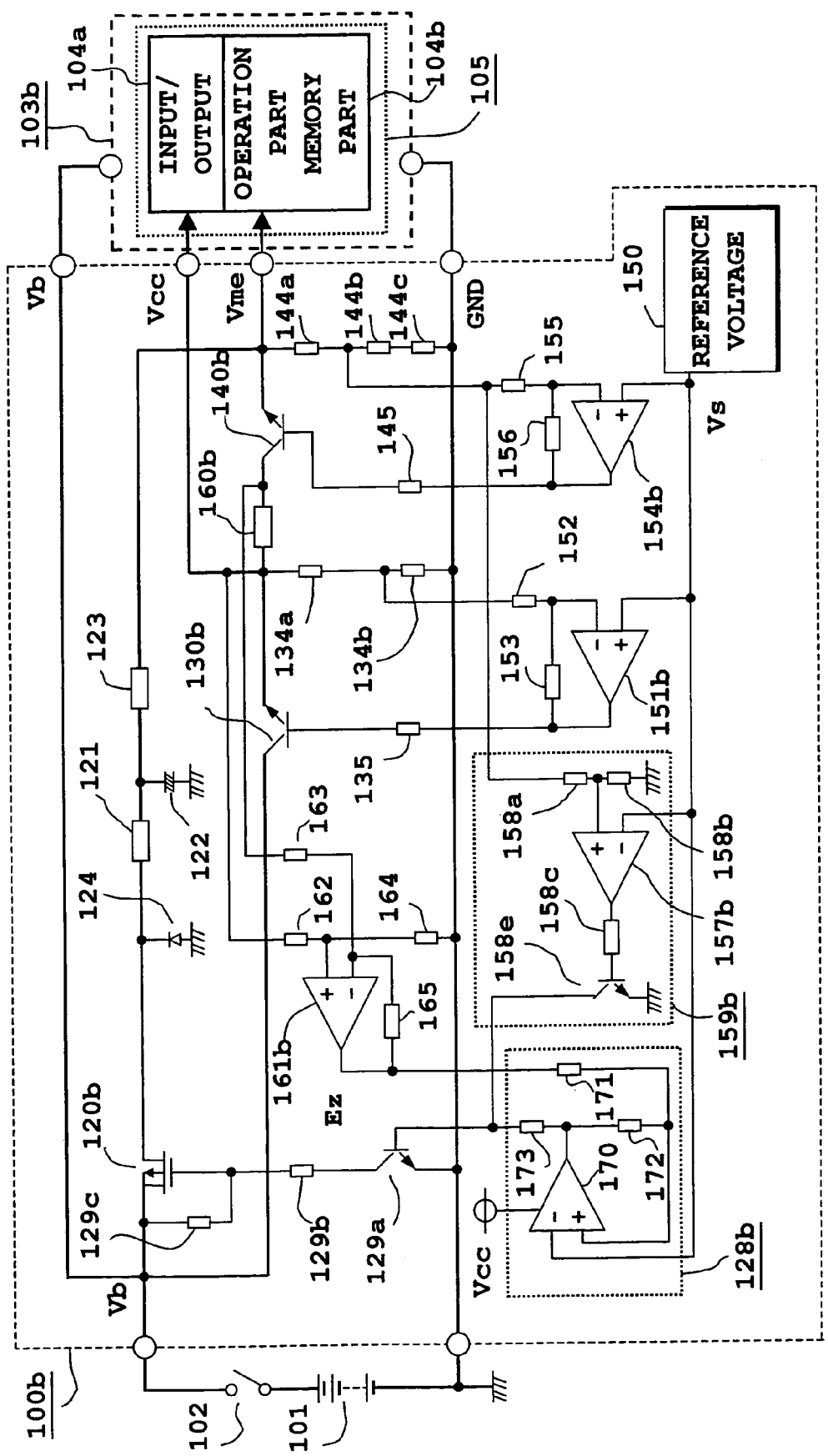
FIG. 4 is a diagram showing an overall circuit arrangement of a constant voltage control device according to a second embodiment.

FIG. 4 is a diagram showing the overall circuit arrangement of a constant voltage control device according to a second embodiment of the invention.

The description is hereinafter made with an emphasis on differences from those of the constant voltage control device according to the foregoing first embodiment shown in FIG. 1.

With reference to FIG. 4, an on-vehicle battery 101, being an external power supply, generates a DC voltage of, for example, DC 12V, and is connected to a constant voltage control device 100b via a power supply switch 102 such as key switch.

An electronic control device 103b is principally formed of a microprocessor 105 consisting of an input/output part 104a and an operation part • memory part 104b that includes various memories.

Further, a first output voltage Vcc=5V or a second output voltage Vme=3.3V (or 2.5V) as described later is supplied to the electronic control device 103b from the constant voltage control device 100b. The input/output part 104a of the microprocessor 105 operates with the first output voltage Vcc, and the operation part • memory part 104b operates with the second output voltage Vme.

A power supply voltage Vb is applied to a source terminal of a third switching element 120b, being an P-channel field effect transistor, and a drain terminal of the third switching element 120b is connected to a smoothing capacitor 122 and a balancing resistor 123 via a choke coil 121.

Additionally, the smoothing capacitor 122 is charged via the choke coil 121 when the third switching element 120b is in a closed circuit. When, however, the third switching element 120b is brought in an open circuit, an attenuating current due to inductance component of the choke coil 121 returns by means of the current return circuit formed of a current return diode 124, the choke coil 121, and the smoothing capacitor 122.

A transistor 129a to be driven from a duty-factor control circuit 128b as described later is connected to a gate terminal of the third switching element 120b via a gate resistor 129b. A circuit-opening ballast resistor 129c is connected between a source terminal and a gate terminal of the third switching element 120b.

The duty-factor control circuit 128b is principally formed of a comparator 170. When a current detection signal voltage Ez to be applied to a non-inverting input of a comparator 170 is not less than a reference voltage Vs to be applied to an inverting input of the comparator 170, an output logic level from the comparator 170 comes to be "H". Further, the transistor 129a is brought in a closed circuit via an output resistor 173, and the third switching element 120b comes to be in a closed circuit.

A first switching element 130b, being a NPN-type junction transistor, is supplied with an electric power via the power supply switch 102 from the external power supply 101 to generate the first output voltage Vcc.

A base resistor 135 is connected between a base terminal of the first switching element 130b and an output terminal of a first comparator/amplifier. The input circuit arrangement of the first comparator/amplifier 151b is the same as that of the first comparator/amplifier 151a of FIG. 1.

A second switching element 140b, being an NPN-type junction transistor, is cascade-connected to the first switching element 130b via a current detection resistor 160b, and generates the second output voltage Vme lower than the first output voltage Vcc.

A base resistor 145 is connected between a base terminal of the second switching element 140b and an output terminal of the second comparator/amplifier 154b. The input circuit arrangement of the second comparator/amplifier 154b is the same as that of the second comparator/amplifier 154a of FIG. 1.

In addition, a by-pass power supply circuit being a series circuit consisting of the third switching element 120b, the choke coil 121 and the balancing resistor 123 is connected in parallel to a series circuit consisting of the first switching element 130b, a current detection resistor 160b and the second switching element 140b.

A non-inverting input terminal of a comparator/amplifier 157b forming an over-voltage suppression circuit 159b is connected to a connection point of voltage-dividing resistors 158a and 158b. These voltage-dividing resistors 158a and 158b are connected in series to each other, and are connected to a connection point of voltage-dividing resistors 144a and 144b.

An output terminal of the comparator/amplifier 157b drives a transistor 158e via a base resistor 158c. This transistor 158e is connected to a base terminal of the transistor 129a, and is connected in such a relationship that the third switching element 120b is brought in an open circuit when the transistor 158e is in a closed circuit.

The over-voltage suppression circuit 159b is formed of a comparator/amplifier 157b, the voltage-dividing resistors 158a and 158b, a base resistor 158c and the transistor 158e; and this over-voltage suppression circuit 159b operates when the second output voltage Vme becomes larger exceeding an allowable limit of error, and forces the third switching element 120b to be in an open circuit.

A third comparator/amplifier 161b acts as a differential-amplifier of voltage across the above-described current detection resistor 160b. A non-inverting input terminal thereof is connected to the high potential side of the current detection resistor 160b via an input resistor 162; and an inverting input terminal thereof is connected to the low potential side of the current detection resistor 160b via an input resistor 163, and is connected to an output terminal of the third comparator/amplifier 161b via a feedback resistor 165. Further, a voltage-dividing resistor 164 is connected in series to an input resistor 162.

The third comparator/amplifier 161a has an output terminal connected to a non-inverting input of the comparator 170 via an input resistor 171.

The comparator 170 has an output terminal connected to a non-inverting input terminal via a feedback resistor 172, and is connected to a base terminal of the transistor 129a via an output resistor 173.

The action and operation of the constant voltage control device arranged as described above according to this second embodiment are hereinafter described with an emphasis on differences from those according to the first embodiment.

With reference to FIG. 4, the first switching element 130b to be supplied with an electric power via the power supply switch 102 from the external power supply 101 when the power supply switch 102 is brought in a closed circuit, has a base current controlled by the first comparator/amplifier 151b, and is continuously controlled to be in such a conduction state that the first output voltage Vcc may be maintained at, for example, DC 5V, being a first predetermined voltage.

On the other hand, the second switching element 140b that is cascade-connected to the first switching element 130b via the current detection resistor 160b has a base current controlled by the second comparator/amplifier 154b, and is continuously controlled to be in such a conduction state that the second output voltage Vme may be maintained at, for example, DC 3.3V (or DC 2.5V), being a second predetermined voltage.

The third comparator/amplifier 161b generates a current detection signal voltage Ez proportional to a current Iz flowing through the current detection resistor 160b. Values of a current detection signal voltage Ez are compared with a reference voltage Vs, which a reference voltage generation circuit 150 generates, thus making the ON/OFF control of the third switching element 120b.

Since the comparator 170 reliably makes the ON/OFF control of the third switching element 120b to reduce power consumption, it has a hysteresis function performed by the feedback resistor 172.

A current detection signal voltage Ez at the time of the third switching element 120b being brought in the open circuit state in response to an output logic level "L" from the comparator 170 is calculated with the following equation when letting resistance values of the input resistor 171 and the feedback resistor 172 R171 and R172:

$$Ez \leq Vs \times (R171+R172)/R172 \quad (8)$$

When rising the current detection signal voltage Ez, an output logic level from the comparator 170 comes to be "H", resulting in the closed circuit state of the third switching element 120b; and thereafter the current detection signal Ez is decreased, and the output logic level from the comparator 170 comes to be "L" again, resulting in the open circuit state of the third switching element 120b. Such a current detection signal voltage Ez is calculated with the following equation:

$$Ez > Vs \times (R171+R172)/R172 - Vcc \times (R171/R172) \quad (9)$$

In addition, a load current Icc flowing through the input/output part 104a of the microprocessor 105 is, for example, 0.1 A, while a load current Ime flowing through the operation part and memory part 104b is, for example, 0.5 A. On the supposition that a control target current flowing through the second switching element 140b is, for example, 0.1 A, and the remaining 0.4 A is supplied from the third switching element 120b, a current flowing through the first switching element 120b comes to be 0.2 A. Thus, power consumption will be decreased to be 0.2/0.6=⅓ as compared with the case that no third switching element 120b is employed.

In the case of less variation in load current, it is preferable that a connecting position of the current detection resistor 160b is changed, and a flowing current through the first switching element side is detected as in FIG. 1 to let a target flowing current 0.2 A.

It is also preferable that as the third switching element 120b, a P-channel field effect transistor as shown is not employed, but an NPN-type junction transistor is used.

Further, in the case where the minimum voltage of the external power supply 101 is sufficiently large as compared with the first output voltage Vcc, an NPN-type junction transistor can be used as the third switching element.

Furthermore, in the case where the minimum voltage of the external power supply 101 is not sufficiently large as compared with the first output voltage Vcc, it is desirable to use a PNP-type junction transistor as shown in FIG. 1 as the first switching element 130b.

As is understood from the foregoing descriptions, the constant voltage control device according to the second embodiment of the invention is a constant voltage control device 100b that is supplied with an electric power from an external power supply 101 of which output voltage Vb is inconstant, and applies plural different types of stabilized voltages to an electronic control device 103b; and the mentioned constant voltage control device 100b comprises a first switching element 130b generating a first output voltage Vcc, a second switching element 140b that is cascade-connected to this first switching element 130b and generates a second output voltage Vme, and a third switching element 120b acting as a by-pass power supply circuit with respect to a series circuit consisting of the mentioned first switching element 130b and second switching element 140b.

The mentioned first switching element 130b is a transistor of which conduction state is negative-feedback controlled by a first comparator/amplifier 151b comparing a voltage proportional to the mentioned first output voltage Vcc with a reference voltage Vs so that the mentioned first output voltage Vcc may be a first predetermined voltage.

The mentioned second switching element 140b is a transistor of which conduction state is negative-feedback controlled by a second comparator/amplifier 154b comparing a voltage proportional to the mentioned second output voltage Vme with a reference voltage Vs so that the mentioned second output voltage Vme may be a second predetermined voltage, being a value smaller than mentioned first predetermined voltage.

The mentioned third switching element 120b is a transistor in which a ratio between a closed-circuit period and a switching cycle is controlled via a duty-factor control circuit 128b, and which makes the control of suppressing a flowing current through mentioned first switching element 130b and second switching element 140b.

In the constant voltage control device 100b according to the second embodiment, the first and second switching elements 130b and 140b that form dropper-type voltage regulators operating at high speed and with high accuracy are connected in series; and the third switching element 120b that forms a switching-type voltage regulator of low power consumption are connected in parallel to the first and second switching elements 130b and 140b.

Additionally, the third switching element 120b forms a by-pass power supply circuit so as to prevent a current flowing through the second switching element 140b from being not less than a predetermined value.

As a result, to cope with the rapid change in power supply voltage or load current, conduction states is immediately controlled with the first and second switching elements 130b and 140b, thus enabling to obtain an output voltage at high speed and with high accuracy. In addition, a load current applied to the first switching element 130b having a large voltage drop amount at the time of high voltage is suppressed, thus enabling to achieve the reduction of power consumption for obtaining the first output voltage Vcc.

Further, a voltage to be applied to the second switching element 140b is further stabilized and suppressed by means of the first switching element 130b, so that it is possible to achieve the reduction of power consumption for obtaining the second output voltage Vme.

Furthermore, according to the second embodiment, the mentioned by-pass power supply circuit further comprises a choke coil 121 and a balancing resistor 123 connected in series to an output circuit of the mentioned third switching element 120b.

Output voltage from the mentioned choke coil 121 is smoothed by a smoothing capacitor 122, and there is provided a current return diode 124 forming a current return circuit including the mentioned choke coil 121 and smoothing capacitor 122 when the mentioned third switching element 120b is brought in an open circuit, and the mentioned balancing resistor 123 is connected between the mentioned smoothing capacitor 122 and an output terminal of the mentioned second switching element 140b.

As a result, it is possible to suppress variations in the charging voltage Vc of the smoothing capacitor 122, and it is possible to suppress a coefficient of variation of a flowing current through the first and second switching elements 130b and 140b due to ripple fluctuation included in a deviation voltage between the charging voltage Vc of the smoothing capacitor 122 and the second output voltage Vme.

In addition, according to the second embodiment, the mentioned constant voltage control device 100b further comprises a current detection resistor 160b connected in series to the mentioned second switching element 140b, and a third comparator/amplifier 161b that amplifies a voltage across this current detection resistor 160b to obtain a current detection signal voltage Ez proportional to a current flowing through the mentioned second switching element 140b; and the mentioned duty-factor control circuit 128b is connected in the relationship of causing a duty factor of the mentioned third switching element 120b to be higher when the mentioned current detection signal voltage Ez is increased.

As a result, a flowing current through the first switching element 130b and the second switching element 140b is accurately suppressed and controlled, thus enabling to reduce temperature rise thereof.

Further, according to the second embodiment, the mentioned constant voltage control device 100b further comprises an over-voltage suppression circuit 159b, and this over-voltage suppression circuit 159b is connected in such a relationship as to act when the mentioned first output voltage Vme is too large, and to cause the mentioned third switching element 120b to be immediately in an open circuit in spite of being in a closed-circuit period determined by the mentioned duty-factor control circuit 128b.

As a result, the transiently rapid increase of the second output voltage Vme with respect to the rapid increase of a power supply voltage is suppressed, thus enabling to obtain a stable output voltage.

Further, according to the second embodiment, each of the mentioned first and second switching elements 130b and 140b is a PNP-type junction transistor; and the mentioned first and second comparators/amplifiers 151b and 154b make the negative feedback control of a conduction state of the mentioned first and second switching elements 130b and 140b in the relationship of continuously supplying a base current substantially proportional to a collector current of this junction transistor.

As a result, it is possible to easily make the continuous negative feedback control of output voltages from the first and second switching elements 130b and 140b using an NPN-type junction transistor of good ratio characteristics between base current and collector current, and of reasonable cost.

Furthermore, according to the second embodiment, the mentioned electronic control device 103b contains a microprocessor 105; and the mentioned first predetermined voltage is a voltage of DC 5V for supplying an electric power to an input/output part 104a of the mentioned microprocessor 105, and the mentioned second predetermined voltage is a voltage of either DC 3.3V or DC 2.5V for supplying an electric power to an operation part and memory part 104b of the mentioned microprocessor 105.

As a result, the first and second switching elements 130b and 140b are connected in series, thus enabling to obtain the second predetermined voltage.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A constant voltage control device that is supplied with an electric power from an external power supply of which output voltage is inconstant, and applies plural different types of stabilized voltages to an electronic control device, the constant voltage control device comprising a first switching element generating a first output voltage, a second switching element that is cascade-connected to said first switching element and generates a second output voltage, and a third switching element acting as a by-pass power supply circuit with respect to said first switching element;

wherein:

said first switching element is a transistor of which conduction state is negative-feedback controlled by a first comparator/amplifier comparing a voltage proportional to said first output voltage with a reference voltage so that said first output voltage may be a first predetermined voltage;

said second switching element is a transistor of which conduction state is negative-feedback controlled by a second comparator/amplifier comparing a voltage proportional to said second output voltage with a reference voltage so that said second output voltage may be a second predetermined voltage, being a value smaller than said first predetermined voltage; and said third switching element is a transistor in which a ratio between a closed-circuit period and a switching cycle is controlled via a duty-factor control circuit, and which makes the control of suppressing a flowing current through said first switching element by forming a shunt circuit when the flowing current through said first switching element is not less than a predetermined value;

said first switching element further comprises a current detection resistor connected in series;

said by-pass power supply circuit further comprises a choke coil and a balancing resistor connected in series to an output circuit of said third switching element;

an output voltage from said choke coil is smoothed by a smoothing capacitor, and a current return diode forming a current return circuit including said choke coil and said smoothing capacitor when said third switching element is brought in an open circuit; and said balancing resistor is connected between said smoothing capacitor and an output terminal of said first switching element or said second switching element.

2. A constant voltage control device that is supplied with an electric power from an external power supply of which output voltage is inconstant, and applies plural different types of stabilized voltages with respect to an electronic control device, the constant voltage control device comprising a first switching element generating a first output voltage, a second switching element that is cascade-connected to said first switching element and generates a second output voltage, and a third switching element acting as a by-pass power supply circuit with respect to a series circuit consisting of said first switching element and second switching element;

wherein said first switching element is a transistor of which conduction state is negative-feedback controlled by a first comparator/amplifier comparing a voltage proportional to said first output voltage and a reference voltage so that said first output voltage may be a first predetermined voltage;

said second switching element is a transistor of which conduction state is negative-feedback controlled by a second comparator/amplifier comparing a voltage proportional to said second output voltage and a reference voltage so that said second output voltage may be a second predetermined voltage, being a value smaller than said first predetermined voltage; and said third switching element is a transistor in which a ratio between a closed-circuit period and a switching cycle is controlled via a duty-factor control circuit, and which makes the control of suppressing a flowing current through said second switching element and said first switching element by forming a shunt circuit when the flowing current through said second switching element is not less than a predetermined value;

said second switching element further comprises a current detection resistor connected in series;

said by-pass power supply circuit further comprises a choke coil and a balancing resistor connected in series to an output circuit of said third switching element;

an output voltage from said choke coil is smoothed by a smoothing capacitor, and there is provided a current return diode forming a current return circuit including said choke coil and smoothing capacitor when said third switching element is brought in an open circuit; and said balancing resistor is connected between said smoothing capacitor and an output terminal of said second switching element.

3. The constant voltage control device according to claim 1, further comprising a third comparator/amplifier that amplifies a voltage across said current detection resistor to obtain a current detection signal voltage proportional to a current flowing through said first switching element;

wherein said duty-factor control circuit causes a duty factor of said third switching element to be higher when said current detection signal voltage is increased.

4. The constant voltage control device according to claim 2, further comprising a third comparator/amplifier that amplifies a voltage across said current detection resistor to obtain a current detection signal voltage proportional to a current flowing through said second switching element;

wherein said duty-factor control circuit causes a duty factor of said third switching element to be higher when said current detection signal voltage is increased.

5. A constant voltage control device that is supplied with an electric power from an external power supply of which output voltage is inconstant, and applies plural different types of stabilized voltages to an electronic control device, the constant voltage control device comprising a first switching element generating a first output voltage, a second switching element that is cascade-connected to said first switching element and generates a second output voltage, and a third switching element acting as a by-pass power supply circuit with respect to said first switching element;

wherein said first switching element is a transistor of which conduction state is negative-feedback controlled by a first comparator/amplifier comparing a voltage proportional to said first output voltage with a reference voltage so that said first output voltage may be a first predetermined voltage;

said second switching element is a transistor of which conduction state is negative-feedback controlled by a second comparator/amplifier comparing a voltage proportional to said second output voltage with a reference voltage so that said second output voltage may be a second predetermined voltage, being a value smaller than said first predetermined voltage;

said third switching element is a transistor in which a ratio between a closed-circuit period and a switching cycle is controlled via a duty-factor control circuit, and which makes the control of suppressing a flowing current through said first switching element; and wherein the constant voltage control device further comprises an over-voltage suppression circuit that acts when said first output voltage is too large, and that causes said third switching element to be immediately in an open circuit in spite of being in a closed-circuit period determined by said duty-factor control circuit.

6. A constant voltage control device that is supplied with an electric power from an external power supply of which output voltage is inconstant, and applies plural different types of stabilized voltages with respect to an electronic control device, the constant voltage control device comprising a first switching element generating a first output voltage, a second switching element that is cascade-connected to said first switching element and generates a second output voltage, and a third switching element acting as a by-pass power supply circuit with respect to a series circuit consisting of said first switching element and second switching element;

wherein said first switching element is a transistor of which conduction state is negative-feedback controlled by a first comparator/amplifier comparing a voltage proportional to said first output voltage and a reference voltage so that said first output voltage may be a first predetermined voltage;

said second switching element is a transistor of which conduction state is negative-feedback controlled by a second comparator/amplifier comparing a voltage proportional to said second output voltage and a reference voltage so that said second output voltage may be a second predetermined voltage, being a value smaller than said first predetermined voltage;

said third switching element is a transistor in which a ratio between a closed-circuit period and a switching cycle is controlled via a duty-factor control circuit, and which makes the control of suppressing a flowing current through said first switching element and said second switching element; and wherein the constant voltage control device further comprises an over-voltage control circuit that acts when said second output voltage is too large, and that causes said third switching element to be immediately in an open circuit in spite of being in a closed-circuit period determined by said duty-factor control circuit.

7. The constant voltage control device according to claim 1, wherein said third switching element is an N-channel field effect transistor;

the constant voltage control device further comprising a charge pump circuit that obtains an auxiliary output voltage which is higher than an external power supply voltage by the addition to said external power supply, and that functions to apply a circuit-closing command voltage higher than that at a source terminal to a gate terminal of said N-channel field effect transistor.

8. The constant voltage control device according to claim 2, wherein said third switching element is an N-channel field effect transistor;

the constant voltage control device further comprising a charge pump circuit that obtains an auxiliary output voltage which is higher than an external power supply voltage by the addition to said external power supply, and that functions to apply a circuit-closing command voltage higher than that at a source terminal with respect to a gate terminal of said N-channel field effect transistor.

9. The constant voltage control device according to claim 1, wherein both said first switching element and second switching element are an NPN-type or PNP-type junction transistor; and said first comparator/amplifier and second comparator/amplifier make the negative feedback control of a conduction state of said first switching element and second switching element so as to continuously supply a base current substantially proportional to a collector current of said junction transistor.

10. The constant voltage control device according to claim 2, wherein both said first switching element and second switching element are an NPN-type or PNP-type junction transistor; and said first comparator/amplifier and second comparator/amplifier make the negative feedback control of a conduction state of said first switching element and second switching element so as to continuously supply a base current substantially proportional to a collector current of said junction transistor.

11. The constant voltage control device according to claim 1, wherein said electronic control device contains a microprocessor; and said first predetermined voltage is a voltage of DC 5V for supplying an electric power to an input/output part of said microprocessor, and said second predetermined voltage is a voltage of either DC 3.3V or DC 2.5V for supplying an electric power to an operation part and memory part of said microprocessor.

12. The constant voltage control device according to claim 2, wherein said electronic control device contains a microprocessor; and said first predetermined voltage is a voltage of DC 5V for supplying an electric power to an input/output part of said microprocessor, and said second predetermined voltage is a voltage of either DC 3.3V or DC 2.5V for supplying an electric power to an operation part and memory part of said microprocessor.

13. The constant voltage control device according to claim 1, further comprising an over-voltage suppression circuit that acts when said first output voltage is too large, and that causes said third switching element to be immediately in an open circuit in spite of being in a closed-circuit period determined by said duty-factor control circuit.

14. The constant voltage control device according to claim 2, further comprising an over-voltage control circuit that acts when said second output voltage is too large, and that causes said third switching element to be immediately in an open circuit in spite of being in a closed-circuit period determined by said duty-factor control circuit.

* * * * *